United States Patent
Takei et al.

(10) Patent No.: US 12,486,442 B2
(45) Date of Patent: Dec. 2, 2025

(54) ANTIFOGGING COATING COMPOSITION, ANTIFOGGING COATING FILM AND ANTIFOGGING ARTICLE

(71) Applicant: NEOS COMPANY LIMITED, Hyogo (JP)

(72) Inventors: Koki Takei, Konan (JP); Haruka Shigematsu, Konan (JP); Kentaro Nishii, Konan (JP); Shinji Ono, Konan (JP); Hideto Naiki, Konan (JP)

(73) Assignee: NEOS COMPANY LIMITED, Kobe (JP)

( * ) Notice: Subject to any disclaimer, the term of this patent is extended or adjusted under 35 U.S.C. 154(b) by 764 days.

(21) Appl. No.: 17/789,349

(22) PCT Filed: Jan. 6, 2021

(86) PCT No.: PCT/JP2021/000200
§ 371 (c)(1),
(2) Date: Jun. 27, 2022

(87) PCT Pub. No.: WO2021/141044
PCT Pub. Date: Jul. 15, 2021

(65) Prior Publication Data
US 2023/0061460 A1 Mar. 2, 2023

(30) Foreign Application Priority Data

Jan. 10, 2020 (JP) ................. 2020-003245

(51) Int. Cl.
*C09K 3/18* (2006.01)
(52) U.S. Cl.
CPC ..................... *C09K 3/18* (2013.01)
(58) Field of Classification Search
CPC .......... C08K 3/36; C08K 5/5419; C09D 1/00; C09D 7/61; C09D 7/63; C09D 7/70; C09K 3/18
See application file for complete search history.

(56) References Cited

U.S. PATENT DOCUMENTS

| | | |
|---|---|---|
| 2012/0045650 A1 | 2/2012 | Iwazumi |
| 2019/0100674 A1 | 4/2019 | Hama et al. |
| 2019/0263986 A1 | 8/2019 | Nakamichi et al. |
| 2019/0264065 A1 | 8/2019 | Koito et al. |

FOREIGN PATENT DOCUMENTS

| | | |
|---|---|---|
| CN | 103025519 A | 4/2013 |
| CN | 109937141 A | 6/2019 |
| EP | 2605904 A1 | 6/2013 |
| EP | 3527368 A1 | 8/2019 |
| JP | S58-057471 A | 4/1983 |
| JP | H01-141959 A | 6/1989 |
| JP | H107-327522 A | 12/1995 |
| JP | H11-010803 A | 1/1999 |
| JP | 2000-290536 A | 10/2000 |
| JP | 2000-336347 A | 12/2000 |
| JP | 2003-253242 A | 9/2003 |
| JP | 2005-126647 A | 5/2005 |
| JP | 2012-007037 A | 1/2012 |
| JP | 5804996 B2 | 11/2015 |
| JP | 2016-169287 A | 9/2016 |
| JP | 2019-019253 A | 2/2019 |
| JP | 2019-019254 A | 2/2019 |
| KR | 10-2013-0032872 A | 4/2013 |
| WO | 2012/024387 A1 | 2/2012 |
| WO | 2018/092544 A1 | 5/2018 |

OTHER PUBLICATIONS

Machine Translation of JP 2000-336437A (Year: 2000).*
Machine Translation of JP 2019-019254 A (Year: 2019).*
International Search Report for International Application No. PCT/JP2021/000200 dated Mar. 2, 2021, Japan, 3 pages.

* cited by examiner

*Primary Examiner* — Anthony J Green
(74) *Attorney, Agent, or Firm* — United IP Counselors, LLC

(57) ABSTRACT

The purpose of the present invention is to provide an antifogging coating composition which is capable of forming an antifogging coating film that firmly adheres to the surfaces of various base materials including a plastic base material without causing appearance changes such as water drip marks, said antifogging coating film exhibiting antifogging effects for a long period of time. The present invention provides an antifogging coating composition which contains: elongated colloidal silica; and a silane derivative compound mixture that contains at least a silane derivative compound which has a polyethylene glycol chain in each molecule and a silane derivative compound which has an epoxy group in each molecule.

11 Claims, 1 Drawing Sheet

ANTIFOGGING COATING COMPOSITION, ANTIFOGGING COATING FILM AND ANTIFOGGING ARTICLE

CROSS-REFERENCE TO RELATED APPLICATIONS

This application is a National Stage Entry application of PCT International Application No. PCT/JP2021/000200, filed on Jan. 6, 2021, which claims the priority benefit of Japanese Patent Application No. 2020-003245, filed on Jan. 10, 2020, the entire contents of both of which are hereby incorporated by reference.

BACKGROUND

1. Technical Field

The present invention relates to an antifogging coating composition, an antifogging coating film produced using the same, and an antifogging article.

2. Description of the Background

An illumination device such as a headlight of an automobile mainly includes a light source and a transparent member formed of glass, plastic, or the like disposed in front of the light source. Light emitted from the light source is irradiated to the outside and the peripheral portion of the illumination device through the transparent member. In such an illumination device, fog may be generated on the inner side (light source side) of the transparent member, and the intensity of the irradiation light may decrease, resulting in a safety problem. In addition, the amount of light irradiated through the fogged transparent member is small, which may cause a problem in terms of beauty in appearance.

JP 2016-169287 A discloses an antifogging agent composition containing a copolymer (A), a polyfunctional blocked isocyanate compound (B), and a surfactant (C). The antifogging agent composition of JP 2016-169287 A utilizes a conventionally well-known antifogging mechanism. In this antifogging agent composition, the surfactant (C) present in the antifogging coating film to which the antifogging agent composition is applied reduces the surface tension of water attached to the antifogging coating film on the substrate, instantaneously forms a smooth water film, and prevents diffuse reflection of light to prevent fogging. Meanwhile, JP 2005-126647 A discloses an antifogging agent containing an aqueous medium, necklace-like colloidal silica, a silane derivative, and a surfactant. In JP 2005-126647 A, necklace-like colloidal silica having a pH of 8 to 11 (that is, alkaline) when dispersed in an aqueous medium is used. The antifogging agent in JP 2005-126647 A exerts an antifogging effect by coating, with colloidal silica, the surface of a substrate on which a coating film is formed. JP 5804996 B2 discloses an antifogging and antifouling agent for an organic substrate, containing methanol and/or ethanol, isopropyl alcohol, n-propyl alcohol or glycol ether, organosilica sol, tetrahydrofuran, and boric acid. JP 2019-19253 A discloses an antifogging coating composition containing elongated colloidal silica and a silane derivative. This antifogging coating composition can form a stable antifogging coating film on various surfaces of substrates including a plastic substrate without causing a change in appearance, such as a trace of water trickling down, and exhibit an antifogging effect for a long period of time.

BRIEF SUMMARY

When a water film is formed on an antifogging coating film formed from an antifogging agent composition containing a surfactant disclosed in JP 2016-169287 A as a main component, the surfactant dissolves in water, and the surfactant and water may flow together locally. When such a portion is dried, a trace of water trickling down may remain on an antifogging article. In addition, in a coating film formed from an antifogging agent using a silane derivative with emphasis on adhesion with a plastic substrate as in JP 2005-126647, long-term antifogging properties may be impaired due to the influence of the silane derivative. In the antifogging agent containing organosilica sol used in JP 5804996 B2, the hydrophilicity of the formed coating film is low, and the antifogging properties may be hardly developed. An antifogging coating film formed from the antifogging coating composition in JP 2019-19253 hardly causes a change in appearance, such as a trace of water trickling down and has a high antifogging effect, but it may be difficult to maintain the antifogging effect for a long period of time due to the influence of a silane derivative used for improving adhesion with a plastic substrate. In addition, the antifogging coating film in JP 2019-19253 A may have reduced adhesion with a substrate when heated to a high temperature.

An object of the invention is to provide an antifogging coating composition that can firmly adhere to various surfaces of substrates including a plastic substrate without causing a change in appearance, such as a trace of water trickling down, and form an antifogging coating film exhibiting an antifogging effect for a long period of time.

The antifogging coating composition in an embodiment of the present invention comprises elongated colloidal silica and a silane derivative compound mixture comprising at least a silane derivative compound having a polyethylene glycol chain in a molecule and a silane derivative compound having an epoxy group in a molecule.

Another embodiment of the present invention is an antifogging coating film comprising a reaction product of elongated silica and a silane derivative compound, in which the elongated silica and the silane derivative compound are bonded to each other.

Still another embodiment of the present invention is an antifogging article including a substrate and the antifogging coating film.

An antifogging coating film formed using the antifogging coating composition of the present invention instantaneously forms a smooth water film to prevent diffuse reflection of light and is excellent in antifogging performance. The antifogging coating film of the present invention hardly causes a change in appearance, such as a trace of water trickling down after drying. The antifogging coating film of the present invention firmly adheres to a substrate made of plastic or the like, and has high adhesion. Furthermore, an antifogging article (for example, an illumination device) using the antifogging coating composition of the present invention hardly causes a change in appearance, and can maintain a stable light amount for a long period of time.

DETAILED DESCRIPTION

Figure 1:
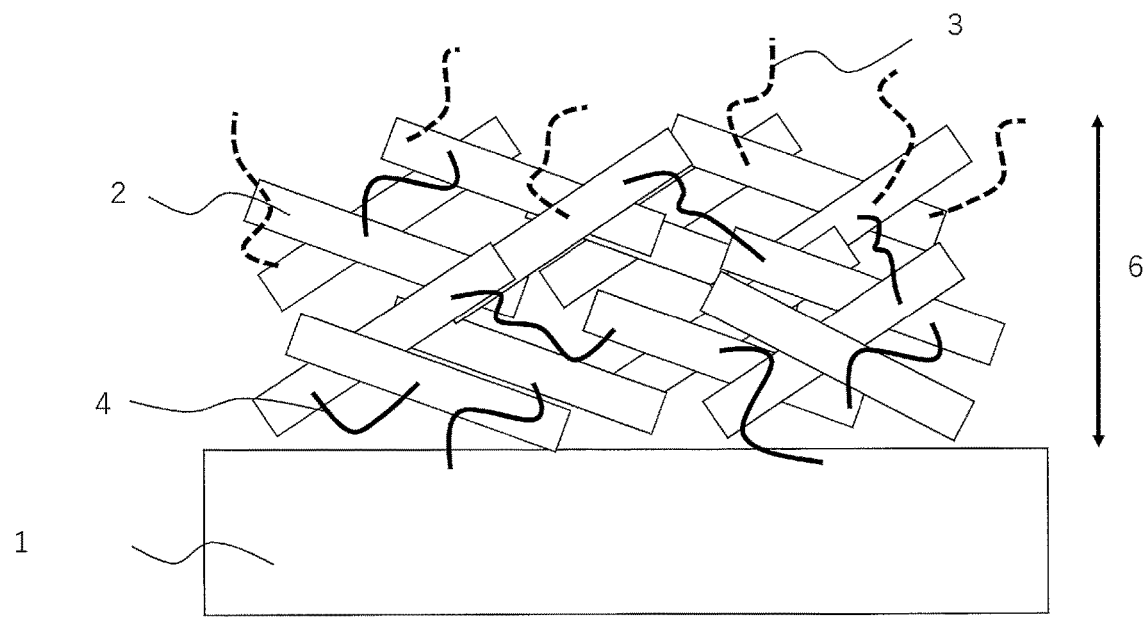
FIG. 1 is a schematic view illustrating a state of an antifogging coating film in which elongated silica is disposed on a surface of a substrate, and a silane derivative compound having a polyethylene glycol chain in the molecule and a silane derivative compound having an epoxy group in the molecule are bonded thereto.

Embodiments of the present invention will be described below. An embodiment of the present invention is an antifogging coating composition comprising elongated colloidal silica and a silane derivative compound mixture comprising at least a silane derivative compound having a polyethylene glycol chain in the molecule and a silane derivative compound having an epoxy group in the molecule.

In the present embodiment, the antifogging coating composition is a composition capable of forming a coating film on a substrate made of glass, plastic, or the like to make it difficult to generate fog due to water droplets caused by water vapor. When there is a temperature difference between both spaces separated by the substrate, moisture in the space having higher temperature condenses on the surface of the substrate to form water droplets. This water droplet causes diffuse reflection of light to generate fog. As a mechanism for preventing the formation of water droplets on a substrate, the following mechanisms have been known: one instantaneously converting moisture adhering to the surface of the substrate into a water film, and the other instantaneously absorbing moisture adhering to the surface of the substrate. In the antifogging coating composition according to the present embodiment, moisture adhering to the surface of the substrate is instantaneously converted into a water film to prevent formation of water droplets, thereby forming an antifogging coating film that prevents fogging of the substrate.

The antifogging coating composition according to the present embodiment comprises elongated colloidal silica. Colloidal silica is a colloidal solution of silicon dioxide (silica, $SiO_2$) or a hydrate thereof. Depending on properties of a dispersion medium for dispersing silica, there are aqueous colloidal silica and organic solvent-based organosilica sol. The silica particularly suitably used in the embodiments is colloidal silica. The primary particle diameter of the spheroidal (ball-shaped) silica forming the colloidal silica is usually about 5 to 300 nm, and the silica primary particles may form larger secondary particles by aggregation or the like. The colloidal silica suitably used in the present embodiment is elongated colloidal silica. The elongated colloidal silica is a colloidal solution of elongated silica. This colloidal solution is made by dispersing, in water, elongated silica in which silica primary particles are covalently bonded to each other to form a long string. As such elongated colloidal silica, chain-like colloidal silica and pearl necklace-like colloidal silica are known. The elongated colloidal silica can spread and adsorb to the surface of the substrate to form a coating film, and thus can be preferably used as a component of the antifogging coating composition. The colloidal silica comprising water as a dispersion medium includes acidic, neutral, and alkaline colloidal silica. Examples of the colloidal silica suitably used in the present embodiment include acidic elongated colloidal silica exhibiting strong acidity at a pH of 1 to 3, elongated colloidal silica exhibiting weak acidity to neutrality to weak alkalinity at a pH of 4 to 9, and elongated colloidal silica exhibiting a pH of 10 to 14, all of which are dispersed in water. These can be used alone, or can be used by mixing them. When a plurality of types of colloidal silica is used by mixing them, they are preferably mixed such that the mixed colloidal silica has a neutral to weakly alkaline pH (about pH 7 to 10). Examples of the elongated colloidal silica that can be used in the embodiments include commercially available products such as ST-OUP, ST-UP, ST-PS-S, ST-PS-M, ST-PS-SO, and ST-PS-MO (all available from Nissan Chemical Industries, Ltd.). The elongated colloidal silicas may be used by mixing them in any combination such that the pH of the antifogging coating composition according to the embodiment is in a range not affecting the substrate to which the antifogging coating composition is applied (usually in a range of weak acidity to weak alkalinity). In addition to a combination of acidic elongated colloidal silica and basic elongated colloidal silica as well as a combination of basic elongated colloidal silica and acidic elongated colloidal silica, neutral elongated colloidal silica can be used alone.

The antifogging coating composition according to the embodiment further comprises a silane derivative compound mixture. The silane derivative compound mixture is preferably a mixture of silane derivative compounds, which at least includes: a silane derivative compound having a polyethylene glycol chain in a molecule and represented by the following General Formula 1-1:

[Chemical Formula 1]

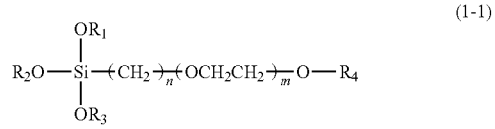

wherein $R_1$, $R_2$ and $R_3$ are each an alkyl group having 1 to 3 carbon atoms, which are identical to or different from one another, $R_4$ is a hydrogen atom or an alkyl group having 1 to 3 carbon atoms, n is an integer of 1 to 5, and m is an integer of 1 to 20, preferably 4 to 20, and more preferably 4 to 15; and a silane derivative compound having an epoxy group in the molecule and represented by the following General Formula 2:

[Chemical Formula 2]

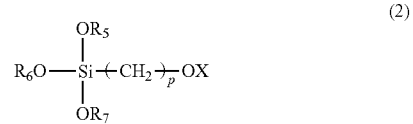

wherein $R_5$, $R_6$, and $R_7$ are each an alkyl group having 1 to 3 carbon atoms, which are identical to or different from one another, p is an integer of 1 to 5, and X is an epoxy group or a glycidyl group.

The silane derivative compound having a polyethylene glycol chain in the molecule may be a silane derivative compound having a polyethylene glycol chain and an acyl group in the molecule and represented by the following General Formula 1-2:

[Chemical Formula 3]

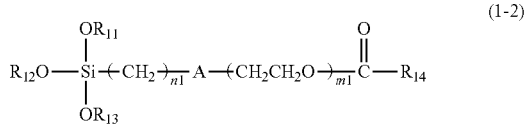
(1-2)

wherein $R_{11}$, $R_{12}$, $R_{13}$, and $R_{14}$ are each an alkyl group having 1 to 3 carbon atoms, which are identical to or different from one another, A is selected from the group consisting of —O—, —NHCOO—, —OCO—, —COO—, —OCH$_2$CH(OH)CH$_2$O—, —OCH$_2$CH$_2$CH(OH)O—, —S—, —SCO—, and —COS—, $n_1$ is an integer of 1 to 5, and $m_1$ is an integer of 1 to 20, preferably 4 to 20, and more preferably 4 to 15. Among the silane derivative compounds represented by General Formula (1-2), the most preferred group of A in the formula is —O—.

The silane derivative compound having a polyethylene glycol chain in the molecule may be a silane derivative compound represented by the following General Formula 1-3:

[Chemical Formula 4]

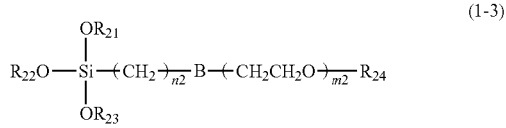
(1-3)

wherein $R_{21}$, $R_{22}$, and $R_{23}$ are each an alkyl group having 1 to 3 carbon atoms, which are identical to or different from one another, $R_{24}$ is a hydrogen atom or an alkyl group having 1 to 3 carbon atoms, B is selected from the group consisting of —NHCOO—, —OCO—, —COO—, —OCH$_2$CH(OH)CH$_2$O—, —OCH$_2$CH$_2$CH(OH)O—, —S—, —SCO—, and —COS—, $n_2$ is an integer of 1 to 5, and $m_2$ is an integer of 1 to 20, preferably 4 to 20, and more preferably 4 to 15. Among the silane derivative compounds represented by General Formula (1-3), the most preferred group of B in the formula is —NHCOO— (urethane group).

The silane derivative compound represented by Formula (1-1) has an alkoxy group capable of reacting with elongated silica (i.e., groups —OR$_1$, —OR$_2$ and —OR$_3$) and a hydrophilic group comprising a polyethylene glycol chain having high affinity with water (—OCH$_2$CH$_2$—). In the embodiments, since the silane derivative compound represented by Formula (1-1) has a substituent capable of reacting with the elongated silica and has a hydrophilic group, the silane derivative compound can be bonded to the elongated silica, and hydrophilicity can be imparted to the antifogging coating film formed by the antifogging coating composition. Examples of the silane derivative compound represented by Formula (1-1) used in the embodiments include polyethylene glycol-modified alkoxysilanes such as methoxy PEG-10 propyltrimethoxysilane and ethoxy PEG-10 propyltrimethoxysilane. As the silane derivative compound having a polyethylene glycol chain in the molecule, commercially available products such as Dynasylan 4148, Dynasylan 4150 (all available from Evonik Japan Co., Ltd.), and methoxy PEG-10 propyltrimethoxysilane (PG series, AZmax.co) can be used. In addition, 2-[hydroxy(polyethyleneoxy)ethyl]trimethoxysilane, 2-[hydroxy(polyethyleneoxy)propyl]trimethoxysilane, 2-[hydroxy(polyethyleneoxy)butyl]trimethoxysilane, 2-[alkoxy(polyethyleneoxy)ethyl]trimethoxysilane, 2-[alkoxy(polyethyleneoxy)propyl]trimethoxysilane, 2-[alkoxy(polyethyleneoxy)butyl]trimethoxysilane, and the like can also be used.

The silane derivative compound represented by Formula (1-2) has an alkoxy group capable of reacting with elongated silica (i.e., groups —OR$_{11}$, —OR$_{12}$ and —OR$_{13}$) and a hydrophilic group comprising a polyethylene glycol chain having high affinity with water (—OCH$_2$CH$_2$—). In the embodiments, since the silane derivative compound represented by Formula (1-2) has a substituent capable of reacting with the elongated silica and has a hydrophilic group, the silane derivative compound can be bonded to the elongated silica, and hydrophilicity can be imparted to the antifogging coating film formed by the antifogging coating composition. Examples of the silane derivative compound represented by Formula (1-2) used in the embodiments include 2-[acetoxy(polyethyleneoxy)propyl]triethoxysilane, 2-[acetoxy(polyethyleneoxy)ethyl]trimethoxysilane, 2-[acetoxy(polyethyleneoxy)propyl]trimethoxysilane, and 2-[acetoxy(polyethyleneoxy)butyl]trimethoxysilane. As the silane derivative compound having a polyethylene glycol chain and an acyl group in the molecule, a commercially available products such as 2-[acetoxy(polyethyleneoxy)propyl]triethoxysilane (Gelest Inc.) can be used.

The silane derivative compound represented by Formula (1-3) has an alkoxy group capable of reacting with elongated silica (i.e., groups —OR$_{21}$, —OR$_{22}$ and —OR$_{23}$) and a hydrophilic group comprising a polyethylene glycol chain having high affinity with water (—OCH$_2$CH$_2$—). In the embodiments, since the silane derivative compound represented by Formula (1-3) has a substituent capable of reacting with the elongated silica and has a hydrophilic group, the silane derivative compound can be bonded to the elongated silica, and hydrophilicity can be imparted to the antifogging coating film formed by the antifogging coating composition. Examples of the silane derivative compound represented by Formula (1-3) used in the embodiments include 2-hydroxy(polyethyleneoxy)ethyl[3-(trimethoxysilyl)propyl]carbamate, 2-hydroxy(polyethyleneoxy)ethyl[3-(triethoxysilyl)propyl]carbamate, 2-alkoxy(polyethyleneoxy)ethyl[3-(trimethoxysilyl)propyl]carbamate, 2-alkoxy(polyethyleneoxy)ethyl[3-(triethoxysilyl)propyl]carbamate, and 2-alkoxy(polyethyleneoxy)ethyl[4-(trimethoxysilyl)butanoic acid]ester. Among the silane derivative compounds represented by Formula (1-3) used in the embodiments, a silane derivative compound having a polyethylene glycol chain and a urethane group in the molecule is most preferred. The silane derivative compound having a polyethylene glycol chain and a urethane group in the molecule can be synthesized by reacting, with polyethylene glycol, an alkoxysilane compound having an isocyanato group, such as isocyanatopropyltrimethoxysilane or isocyanatopropyltriethoxysilane. Among the silane derivative compounds represented by Formula (1-3), a silane derivative compound having a polyethylene glycol chain and a urethane group in the molecule, which can be particularly suitably used in the embodiments, may be referred herein to as "urethane silane". In addition, the silane derivative compounds represented by the Formulas (1-1), (1-2), and (1-3) may be collectively referred to as "silane derivative compound having a polyethylene glycol chain in a(the) molecule".

The silane derivative compound represented by Formula (2) has an alkoxy group capable of reacting with elongated silica (i.e., groups —OR$_5$, —OR$_6$ and —OR$_7$) and X (i.e., an epoxy group and a glycidyl group). In the embodiments, since the silane derivative compound represented by Formula (2) has a substituent capable of reacting with the elongated silica, the silane derivative compound can establish crosslinking between the elongated silicas. Examples of the silane derivative compound represented by Formula (2) used in the embodiments include epoxy group-containing silane derivative compounds such as 3-glycidoxypropyltriethoxysilane, 3-glycidoxypropyltrimethoxysilane, 3-glycidoxypropylmethyldimethoxysilane, and 3-glycidoxypropylmethyldiethoxysilane. As the silane derivative compound having an epoxy group in the molecule, commercially available products such as Dynasylan GLYEO (Evonik Japan Co., Ltd.), KBM402, KBM403, KBE402, and KBE403 (all available from Shin-Etsu Chemical Co., Ltd.) can be used. As described above, the silane derivative compound can react with and bond to the elongated silica, establish crosslinking between the elongated silicas, increase the strength of the antifogging coating film, and impart hydrophilicity to the antifogging coating film.

The silane derivative compound mixture is preferably comprised in an amount of 0.1 parts by weight or more and 10.0 parts by weight or less in terms of solid content per 100 parts by weight of the elongated colloidal silica in terms of solid content. Since the elongated colloidal silica comprises water as a dispersion medium as described above, the blending amount of the silane derivative compound is determined with respect to the weight of the substantial solid content dispersed in water. When the blending amount of the silane derivative compound is less than 0.1 parts by weight in terms of solid content per 100 parts by weight of the elongated colloidal silica in terms of solid content, the wettability during application of the antifogging coating composition to a substrate may be deteriorated, and the strength of the formed coating film may be reduced to deteriorate the durability of the coating film. On the other hand, when the blending amount of the silane derivative compound is more than 10.0 parts by weight in terms of solid content per 100 parts by weight of the elongated colloidal silica in terms of solid content, the antifogging properties of the antifogging coating film formed from the antifogging coating composition may be deteriorated. As described above, the silane derivative compound is used for forming a good coating film of silica by reacting with silica comprised in colloidal silica that is a constituent component of the antifogging coating composition. Thus, it is sufficient that an adequate amount of the silane derivative compound for reacting with part of silica is blended.

The antifogging coating composition according to the embodiment may further comprise spheroidal colloidal silica. Like the above-described elongated colloidal silica, the spheroidal colloidal silica is also a colloidal solution of silicon dioxide (Silica, SiO$_2$) or a hydrate thereof. The spheroidal colloidal silica has a substantially spherical particle shape in water. As described above, colloidal silica comprising water as a dispersion medium includes acidic, neutral, and basic colloidal silica. Examples of the spheroidal colloidal silica suitably used in the present embodiment include acidic spheroidal colloidal silica exhibiting strong acidity at a pH of 1 to 3, neutral spheroidal colloidal silica exhibiting weak acidity to neutrality to weak alkalinity at a pH of 4 to 9, and basic spheroidal colloidal silica exhibiting a pH of 10 to 14, all of which are dispersed in water and these can be used alone, or can be used by mixing them. In the embodiments, preferably, basic spheroidal colloidal silica is used as the spheroidal colloidal silica, and the pH of the above-described elongated colloidal silica mixture is adjusted to weak acidity to weak alkalinity. The elongated colloidal silica and the spheroidal colloidal silica is preferably mixed such that the solid content weight ratio between the elongated colloidal silica and the spheroidal colloidal silica is 12:10 to 35:10, and preferably 15:10 to 30:10. Examples of the spheroidal colloidal silica that can be used in the embodiments include commercially available products such as ST-N, ST-NXS, ST-S, ST-XS, ST-O, ST-OXS (all available from Nissan Chemical Industries, Ltd.). The above-described elongated colloidal silica and spheroidal colloidal silica may be mixed in any combination such that the pH of the antifogging coating composition according to the embodiment is in a range not affecting the substrate to which the antifogging coating composition is applied (usually in a range of weak acidity to weak alkalinity). For example, acidic elongated colloidal silica, basic elongated colloidal silica, and basic spheroidal colloidal silica can be used by mixing them. Other examples of the combination include a combination of basic elongated colloidal silica and acidic spheroidal colloidal silica, a combination of acidic elongated colloidal silica and basic spheroidal colloidal silica, a combination of neutral elongated colloidal silica and acidic spheroidal colloidal silica, a combination of basic elongated colloidal silica and neutral spheroidal colloidal silica, and a combination of basic elongated colloidal silica, acidic spheroidal colloidal silica, and basic spheroidal colloidal silica. In this way, the elongated colloidal silica and the spheroidal colloidal silica can be mixed in any combination.

In the embodiments, when the elongated colloidal silica and the spheroidal colloidal silica are used in combination, it is very preferable that the elongated colloidal silica is a mixture of acidic elongated colloidal silica and basic elongated colloidal silica, and the spheroidal colloidal silica is basic spheroidal colloidal silica. These colloidal silicas are appropriately blended, thereby making it possible to adjust the pH of the colloidal silica mixture from weak acidity to weak alkalinity. When the elongated colloidal silica and the spheroidal colloidal silica are used in combination, the silane derivative compound mixture is preferably comprised in an amount of 0.1 parts by weight or more and 10.0 parts by weight or less in terms of solid content per 100 parts by weight of the total amount of the elongated colloidal silica and the spheroidal colloidal silica in terms of solid content. Since the elongated colloidal silica and the spheroidal colloidal silica comprise water as a dispersion medium as described above, the blending amount of the silane derivative compound is determined with respect to the weight of the substantial solid content dispersed in water. When the blending amount of the silane derivative compound is less than 0.1 parts by weight in terms of solid content per 100 parts by weight of the total amount of the elongated colloidal silica and the spheroidal colloidal silica in terms of solid content, the wettability during application of the antifogging coating composition to the substrate may be deteriorated. Further, the strength of the formed coating film may be reduced to deteriorate the durability of the coating film. On the other hand, when the blending amount of the silane derivative compound is more than 10.0 parts by weight in terms of solid content per 100 parts by weight of the total amount of the elongated colloidal silica and the spheroidal colloidal silica in terms of solid content, the antifogging properties of the antifogging coating film formed from the antifogging coating composition may be deteriorated. As described above, the silane derivative compound is used for forming a good coating film of silica by reacting with silica comprised in colloidal silica that is a constituent component of the antifogging coating composition. Thus, it is sufficient that an adequate amount of the silane derivative compound for reacting with part of silica is blended.

The antifogging coating composition according to the embodiment may further comprise a surfactant. In the antifogging coating composition according to the embodiment, the surfactant is used to assist the spreading of each colloidal silica onto the surface of the substrate and to facilitate the coating work. As the surfactant, any of an anionic surfactant, a cationic surfactant, a nonionic surfactant, and an amphoteric surfactant can be used, and one, or two or more of these surfactants can be used. Examples of the anionic surfactant include: fatty acid salts such as sodium oleate and potassium oleate; higher alcohol sulfates such as sodium lauryl sulfate and ammonium lauryl sulfate; alkyl benzene sulfonate and alkyl naphthalene sulfonate such as sodium dodecylbenzene sulfonate and sodium alkyl naphthalene sulfonate; naphthalene sulfonate formalin condensates; dialkyl sulfosuccinate salts; dialkyl phosphate salts; polyoxyethylene sulfate salts such as sodium polyoxyethylene alkylphenyl ether sulfate; and anionic fluorine-based surfactants of the sulfonate salt type containing a perfluoroalkyl group, the carboxylate salt type containing a perfluoroalkyl group, the sulfonate salt type containing a perfluoroalkenyl group, the carboxylate salt type containing a perfluoroalkenyl group, and the like. Examples of the cationic surfactant include: amine salts such as ethanolamines, laurylamine acetate, triethanolamine monoformate, and stearamidoethyldiethylamine acetate; quaternary ammonium salts such as lauryltrimethylammonium chloride, stearyltrimethylammonium chloride, dilauryldimethylammonium chloride, distearyldimethylammonium chloride, lauryldimethylbenzylammonium chloride, and stearyldimethylbenzylammonium chloride; and cationic fluorine-based surfactants of the quaternary ammonium salt type containing a perfluoroalkyl group or a perfluoroalkenyl group, and the like.

Examples of the nonionic surfactant include: polyoxyethylene higher alcohol ethers such as polyoxyethylene lauryl alcohol, polyoxyethylene lauryl ether and polyoxyethylene oleyl ether; polyoxyethylene alkyl aryl ethers such as polyoxyethylene octylphenol and polyoxyethylene nonylphenol; polyoxyethylene acyl esters such as polyoxyethylene glycol monostearate; polypropylene glycol ethylene oxide adducts; polyoxyethylene sorbitan fatty acid esters such as polyoxyethylene sorbitan monolaurate and polyoxyethylene sorbitan monostearate; phosphates such as alkyl phosphate and polyoxyethylene alkyl ether phosphate; sugar esters; cellulose ethers; silicones such as polyether-modified silicone oils; and nonionic fluorine-based surfactants of the ethylene oxide adduct type containing a perfluoroalkyl group, the amine oxide type containing a perfluoroalkyl group, the oligomer type containing a perfluoroalkyl group, the ethylene oxide adduct type containing a perfluoroalkenyl group, the amine oxide type containing a perfluoroalkenyl group, and the oligomer type containing a perfluoroalkenyl group, and the like. Examples of the amphoteric surfactant include: quaternary ammonium salts such as lauryltrimethylammonium chloride, dilauryldimethylammonium chloride, distearyldimethylammonium chloride, and lauryldimethylbenzylammonium chloride; fatty acid type amphoteric surfactants such as dimethyl alkyl lauryl betaine and dimethyl alkyl stearyl betaine; sulfonic acid type amphoteric surfactants such as dimethyl alkyl sulfobetaine; alkylglycine; and betaine type amphoteric fluorine-based surfactants containing a perfluoroalkyl group or a perfluoroalkenyl group. As the surfactant according to the present embodiment, any of the surfactants described above can be preferably used. The surfactant is preferably contained in an amount of about 0.01 to 1 part by weight per 100 parts by weight of the antifogging coating composition.

The antifogging coating composition according to the embodiment may further comprise an organic solvent. Only a mixture of a silane derivative compound and colloidal silica that comprises water as a dispersion medium and serves as a main component of the antifogging coating composition according to the embodiment can be applied onto the surface of the substrate to form an antifogging coating film. However, if an organic solvent is further comprised, drying of water is facilitated, whereby an antifogging coating film can be formed more quickly. The organic solvent that can be used in the embodiments is an organic solvent that is compatible with water or miscible with water to a certain extent. Examples of such an organic solvent include alcohols (methanol, ethanol, propanol, isopropanol, ethylene glycol, propylene glycol, diacetone alcohol, and the like), ethers (dimethoxyethane, tetrahydrofuran, dioxane, propylene glycol monomethyl ether, ethylene glycol monomethyl ether, ethylene glycol monoethyl ether, ethylene glycol monopropyl ether, ethylene glycol monobutyl ether, ethylene glycol tertiary butyl ether, ethylene glycol phenyl ether, diethylene glycol monomethyl ether, diethylene glycol monobutyl ether, diethylene glycol monobutyl ether, triethylene glycol monobutyl ether, dipropylene glycol monomethyl ether, and the like), ketones (acetone, ethyl methyl ketone, and the like), amides (dimethylformamide and the like), dimethyl sulfoxide (DMSO), acetonitrile, nitromethane, and triethylamine, and these can be used by mixing them. The organic solvent is preferably comprised in an amount of about 1 to 80 parts by weight per 100 parts by weight of the antifogging coating composition. In particular, a small amount of a solvent (diacetone alcohol or the like) capable of slightly dissolving the surface of the plastic substrate is preferably mixed with the organic solvent. The diacetone alcohol slightly dissolves the surface of the plastic substrate and increases the surface area of the plastic substrate, and thus the antifogging coating composition can penetrate into the plastic substrate. As a result, the antifogging coating film formed from the antifogging coating composition firmly adheres to the surface of the plastic substrate. When diacetone alcohol is mixed in the organic solvent for such a purpose, 1 to 7%, preferably 1 to 5% of diacetone alcohol is desirably mixed per 100 parts by weight of the antifogging coating composition. Mixing too much diacetone alcohol reduces the wettability to the plastic substrate, and thus an appropriate antifogging coating film cannot be formed. Therefore, a slight amount of diacetone alcohol is preferably used to the extent that the antifogging coating composition slightly penetrates near the surface of the plastic substrate.

A preferred antifogging coating composition according to the present embodiment can be produced by first preparing elongated colloidal silica and a silane derivative compound mixture, and then mixing spheroidal colloidal silica, a surfactant, and an organic solvent therewith as necessary. Since the elongated colloidal silica is dispersed in water as a dispersion medium at a specific solid content ratio, the silane derivative compound can be mixed through performing calculation in such a manner that the weight of the silane derivative is 0.1 parts by weight or more and 10 parts by weight or less per 100 parts by weight of the elongated colloidal silica in terms of solid content. In addition to these components, additives (e.g., dyes, pigments, plasticizers, dispersants, preservatives, matting agents, antistatic agents, flame retardants) usually comprised in the coating composition can be appropriately blended in the antifogging coating composition according to the embodiment.

The antifogging coating composition according to the embodiment in which the elongated colloidal silica, the silane derivative compound mixture, and optionally the spheroidal colloidal silica, the surfactant, and the organic solvent are appropriately blended can be applied to the surface of the substrate. Examples of the substrate include glass, plastic, metal, and the like, but the antifogging coating composition according to the embodiment can be suitably applied onto a transparent plastic in particular. The antifogging coating composition can be appropriately applied to the surface of the substrate by a conventional coating method such as a doctor blade method, a bar coating method, a dipping method, an air spray method, a roller brush method, or a roller coater method. The applied antifogging coating composition can be heated to form an antifogging coating film. The heating of the antifogging coating composition only requires that the antifogging coating composition be heated to a temperature sufficient for the silica and the silane derivative to react with each other and for water (and an organic solvent, if comprised) to evaporate. Although depending on the type of the organic solvent to be used, the reaction can be made smooth progress and water and the organic solvent can be evaporated by heating the antifogging coating composition to usually about 80 to 150° C., preferably about 100 to 150° C. The antifogging coating composition coated product can be heated by a heating method using hot air from a dryer or the like, in addition to heating using a heating device such as a burner or an oven. In this way, when water and an organic solvent is dried by applying the antifogging coating composition according to the embodiment to the substrate and heating the composition, the elongated colloidal silica (and the spheroidal colloidal silica in some cases) spread on the surface of the substrate becomes the elongated silica (and the spheroidal colloidal silica in some cases) to form a coating film. On the other hand, the silane derivative compound binds to these silicas and establishes crosslinking between the silicas to form a strong higher-order structure. Thus, by applying the antifogging coating composition according to the embodiment to an article, an antifogging coating film can be formed to obtain an antifogging article.

Another embodiment of the present invention is an antifogging coating film comprising a reaction product of elongated silica and a silane derivative compound. In the antifogging coating film according to the embodiment, the elongated silica and the silane derivative compound are bonded. In the antifogging coating film according to the embodiment, the silane derivative compound is preferably a silane derivative compound mixture comprising at least a silane derivative compound having a polyethylene glycol chain in the molecule and a silane derivative compound having an epoxy group in the molecule. As for the antifogging coating composition according to the embodiment comprising the elongated colloidal silica and the silane derivative compound mixture, technologically significant points will be described below with reference to the drawings. Note that the structure of the antifogging coating film and the theory about the mechanism of the development of adhesion are not necessarily limited to the following.

FIG. 1 is a view illustrating a state of an antifogging coating film formed from an antifogging coating composition (an embodiment of the present invention) comprising elongated colloidal silica and a silane derivative compound mixture according to the embodiment. In FIG. 1, reference numerals mean as follows: 1: a substrate; 2: elongated silica; 3: a group derived from a silane derivative compound having a polyethylene glycol chain in the molecule; 4: a group derived from a silane derivative compound having an epoxy group in the molecule; and 6: an antifogging coating film. In the antifogging coating film 6 of FIG. 1, the elongated silicas 2 each having a long shape (e.g., a tubular shape, a rod shape, or a string shape) are drawn to be disposed in a state in which the length directions thereof are substantially aligned, but in the actual antifogging coating film 6, the elongated silicas 2 are not necessarily disposed regularly. In FIG. 1, the elongated silica 2 having a relatively rigid long structure is disposed on the substrate 1, and a silane derivative compound having a polyethylene glycol chain in the molecule is bonded thereto. On the other hand, a silane derivative compound having an epoxy group in the molecule is bonded to the elongated silica 2, and establishes crosslinking between the elongated silicas 2. The silane derivative compound having an epoxy group in the molecule establishes crosslinking between the substrate 1 and the elongated silica 2 in some cases. When water vapor comes into contact with the antifogging coating film 6 illustrated in FIG. 1, the group 3 derived from a silane derivative compound having a polyethylene glycol chain as a hydrophilic group in the molecule exists in the antifogging coating film 6, and thus a water film is immediately formed on the antifogging coating film 6. On the other hand, since the group 4 derived from a silane derivative compound having an epoxy group in the molecule establishes crosslinking between the elongated silicas 2 and between the substrate 1 and the elongated silica 2, the antifogging coating film 6 having a higher-order structure is firmly adhered to the substrate 1.

Figure 2:
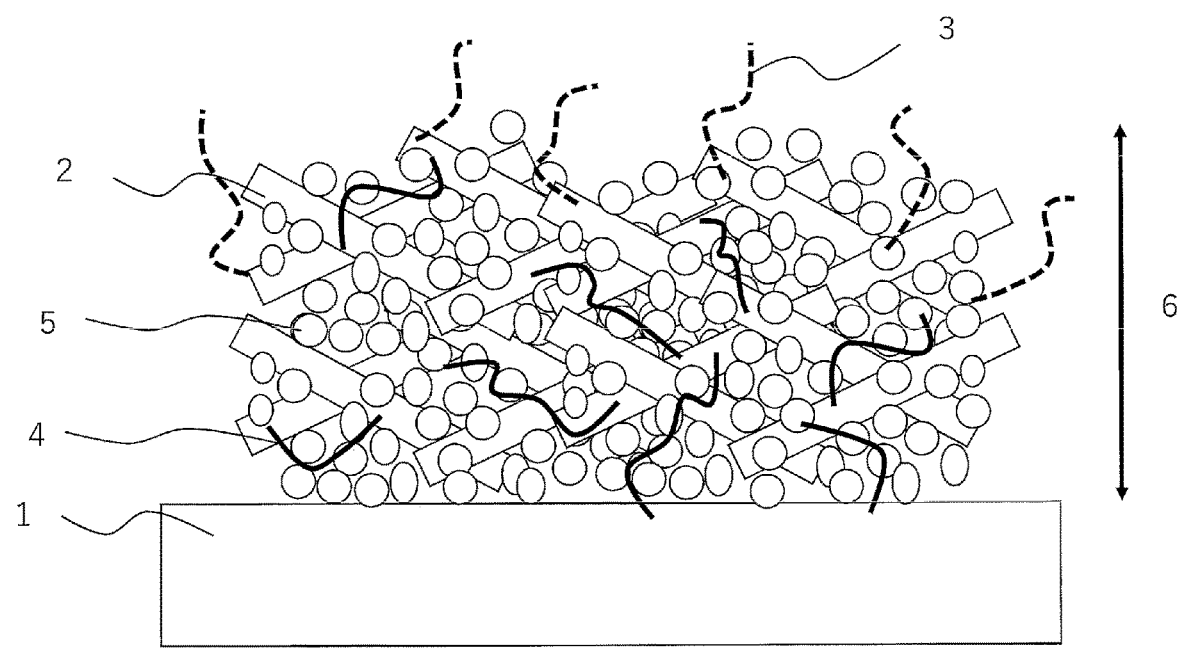
FIG. 2 is a schematic view illustrating a state of an antifogging coating film in which spheroidal silica is embedded in a void between adjacent elongated silicas, and a silane derivative compound having a polyethylene glycol chain in the molecule and a silane derivative compound having an epoxy group in the molecule are bonded thereto.

FIG. 2 is a view illustrating a state of an antifogging coating film formed from an antifogging coating composition (another embodiment of the present invention) comprising elongated colloidal silica, a silane derivative compound mixture, and spheroidal colloidal silica. In FIG. 2, reference numerals mean as follows: 1: a substrate; 2: elongated silica; 3: a group derived from a silane derivative compound having a polyethylene glycol chain in the molecule; 4: a group derived from a silane derivative compound having an epoxy group in the molecule; 5: spheroidal silica; and 6: an antifogging coating film. In the antifogging coating film 6 of FIG. 2, the elongated silicas 2 each having a long shape (e.g., a tubular shape, a rod shape, or a string shape) are drawn to be disposed in a state in which the length directions thereof are substantially aligned, but in the actual antifogging coating film 6, the elongated silicas 2 are not necessarily disposed regularly. In FIG. 2, the elongated silica 2 having a relatively rigid long structure is disposed on the substrate 1, and the spheroidal silica 5 smaller than the size of a void (this void usually have a size of about several hundred nanometers to several micrometers; i.e., the size of the spheroidal silica 5 is several nanometers to several tens of nanometers) is embedded in the void which may be present in some places between the adjacent elongated silicas 2. Although the spheroidal silicas 5 are not disposed so as to completely fill the voids, it is considered that the spheroidal silicas 5 are disposed so as to substantially eliminate the voids as illustrated in FIG. 2. A silane derivative compound having a polyethylene glycol chain in the molecule is bonded to the elongated silica 2 and the spheroidal silica 5. On the other hand, a silane derivative compound having an epoxy group in the molecule is bonded to the elongated silica 2 and the spheroidal silica 5, and establishes crosslinking between the elongated silicas 2, between the elongated silica 2 and the spheroidal silica 5, and between the spheroidal silicas 5. In some cases, the silane derivative compound having an epoxy group in the molecule establishes crosslinking between the substrate 1 and the elongated silica 2 or between the substrate 1 and the spheroidal silica 5. When water vapor comes into contact with the antifogging coating film 6 illustrated in FIG. 2, the group 3 derived from a silane derivative compound having a polyethylene glycol chain as a hydrophilic group in the molecule exists in the antifogging coating film 6, and thus a water film is immediately formed on the antifogging coating film 6. On the other hand, since the group 4 derived from a silane derivative compound having an epoxy group in the molecule establishes crosslinking between the elongated silicas 2, between the elongated silica 2 and the spheroidal silica 5, between the spheroidal silicas 5, between the substrate 1 and the elongated silica 2, or between the substrate 1 and the spheroidal silica 5, the antifogging coating film 6 having a higher-order structure is firmly adhered to the substrate 1. In the antifogging coating film according to the embodiment, the elongated silica may comprise acidic elongated silica and basic elongated silica, and the spheroidal silica may be basic spheroidal silica. In this embodiment, the acidic elongated silica is elongated silica that exhibits acidity when dispersed in water. Further, the basic elongated silica is elongated silica that exhibits basicity when dispersed in water. Furthermore, the basic spheroidal silica is spheroidal silica that exhibits basicity when dispersed in water.

An antifogging coating film can be formed by applying the antifogging coating composition according to the embodiment to a substrate. In addition, an antifogging article having the antifogging coating film according to the embodiment on the substrate can be obtained. Examples of the antifogging article according to the embodiment include an illumination device, a headlight, a window, a lens, a lens cover, a monitor, and a monitor cover. The antifogging article according to the embodiment has excellent antifogging performance and does not cause changes in appearance, such as formation of a trace of water trickling down, even when the antifogging article is exposed to unexpected high temperature conditions. Since the antifogging coating film according to the embodiment is firmly bonded to a substrate made of plastic or the like and has high adhesion, it is possible to provide an antifogging article having high durability at a high temperature and exhibiting an antifogging effect for a long period of time.

EXAMPLES (1) Preparation of Antifogging Coating Composition (Elongated Colloidal Silica and Silane Derivative Compound Mixture)

Antifogging coating compositions were prepared by mixing the following materials: acidic elongated colloidal silica (ST-OUP [solid content: 15%, aqueous dispersion], Nissan Chemical Industries, Ltd.), basic elongated colloidal silica (ST-UP [solid content: 20%, aqueous dispersion], Nissan Chemical Industries, Ltd.), a silane derivative compound having a polyethylene glycol chain in the molecule (Dynasylan 4148 [solid content: 100%], Evonik Japan Co., Ltd.), a silane derivative compound having an epoxy group in the molecule (KBM403 [solid content: 100%], Shin-Etsu Chemical Co., Ltd.), a surfactant (NEOCOL-YSK [Solid content: 70%, propylene glycol-water mixed dispersion], DKS Co., Ltd.), a surfactant (KF640, Shin-Etsu Chemical Co., Ltd.), and an organic solvents (propylene glycol monomethyl ether available from NIPPON NYUKAZAI CO., LTD., and diacetone alcohol available from Tokyo Chemical Industry Co., Ltd.). The constituent configuration of each antifogging coating composition are given in Tables 1 and 2. In addition, X-12-1098 ([solid content: 30%, aqueous dispersion], Shin-Etsu Chemical Co., Ltd.), which is a silane derivative compound not corresponding to any of a silane derivative compound having a polyethylene glycol chain in the molecule and a silane derivative compound having an epoxy group in the molecule, was prepared as one type of silane derivative compound, and used as antifogging coating compositions of comparative examples.

TABLE 1

Blending of antifogging coating composition and evaluation of antifogging coating film (Examples)

| | | | Examples | |
|---|---|---|---|---|
| | | | 1 | 2 |
| Antifogging coating composition (parts by weight) | Elongated colloidal silica | ST-OUP | 63.13 | 61.71 |
| | | ST-UP | 15.78 | 15.43 |
| | Silane derivative compound | Dynasylan 4148 | 0.33 | 0.32 |
| | | KBM403 | 0.47 | 0.46 |
| | | X-12-1098 | | |
| | Surfactant | NC-YSK | 0.28 | 0.27 |
| | | KF640 | 0.14 | 0.13 |
| | Solvent | PGM | 17.28 | 17.35 |
| | | DAA | 2.59 | 4.33 |
| | Total | | 100 | 100 |
| Evaluation | Initial coating film | Coatability | Good | Good |
| | | Antifogging properties | Not fogged | Not fogged |
| | | Adhesion | Good | Good |
| | Coating film after wet heat resistance test | Antifogging properties | Not fogged | Not fogged |
| | | Adhesion | Good | Good |
| | Coating film after heat resistance test | Antifogging properties | Not fogged | Not fogged |
| | | Adhesion | Good | Good |

TABLE 2

Blending of antifogging coating composition and evaluation of antifogging coating film (Comparative Examples)

| | | | Comparative Examples | | | | |
|---|---|---|---|---|---|---|---|
| | | | 1 | 2 | 3 | 4 | 5 |
| Antifogging coating composition | Elongated colloidal silica | ST-OUP | 63.13 | 62.61 | 65.25 | 64.55 | 58.12 |
| | | ST-UP | 15.78 | 15.65 | 16.31 | 16.14 | 14.53 |

TABLE 2-continued

Blending of antifogging coating composition and evaluation of antifogging coating film (Comparative Examples)

| | | | Comparative Examples | | | | |
|---|---|---|---|---|---|---|---|
| | | | 1 | 2 | 3 | 4 | 5 |
| (parts by weight) | Silane derivative compound | Dynasylan 4148 | 0.33 | 0.33 | 0.34 | 0.34 | 0.31 |
| | | KBM403 | | | 0.48 | 0.48 | 0.43 |
| | | X-12-1098 | | 1.10 | | | |
| | Surfactant | NC-YSK | 0.28 | 0.27 | 0.29 | 0.28 | 0.25 |
| | | KF640 | 0.14 | 0.14 | 0.14 | 0.14 | 0.13 |
| | Solvent | PGM | 17.75 | 17.31 | 17.19 | 17.21 | 17.48 |
| | | DAA | 2.59 | 2.59 | | 0.86 | 8.75 |
| | | Total | 100 | 100 | 100 | 100 | 100 |
| Evaluation | Initial coating film | Coatability | Good | Good | Good | Good | Poor |
| | | Antifogging properties | Not fogged | Not fogged | Not fogged | Not fogged | Not fogged |
| | | Adhesion | Good | Good | Good | Good | Good |
| | Coating film after wet heat resistance test | Antifogging properties | Not fogged | Fogged | Not fogged | Not fogged | Not fogged |
| | | Adhesion | Poor | Poor | Poor | Poor | Good |
| | Coating film after heat resistance test | Antifogging properties | Not fogged | Fogged | Not fogged | Not fogged | Not fogged |
| | | Adhesion | Good | Good | Good | Good | Good |

The meanings of the abbreviations in Tables 1 and 2 are as follows:

ST-OUP: Trade name of acidic elongated colloidal silica, available from Nissan Chemical Industries, Ltd.

ST-UP: Trade name of basic elongated colloidal silica, available from Nissan Chemical Industries, Ltd.

NC-YSK: NEOCOL-YSK, trade name of anionic surfactant, available from DKS Co., Ltd.

KF640: Trade name of nonionic surfactant, available from Shin-Etsu Chemical Co., Ltd.

PGM: Propylene glycol monomethyl ether

DAA: Diacetone alcohol

Dynasylan 4148: Trade name of a silane derivative compound having a polyethylene glycol chain in the molecule and represented by the following formula:

[Chemical Formula 5]

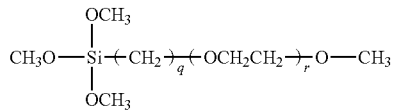

wherein q is a number corresponding to n in the above-described Formula 1-1, and r is a number corresponding to m in the above-described Formula 1-1, available from Evonik Japan Co., Ltd.

KBM403: Trade name of 3-glycidoxypropyltrimethoxysilane, which is a silane derivative compound having an epoxy group in the molecule and represented by the following formula:

[Chemical Formula 6]

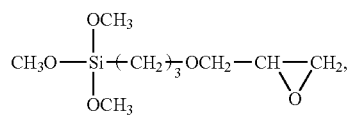

available from Shin-Etsu Chemical Co., Ltd.

X-12-1098: Trade name of a silane derivative compound not corresponding to any of a silane derivative compound having a polyethylene glycol chain in the molecule and a silane derivative compound having an epoxy group in the molecule, which is represented by the following formula:

[Chemical Formula 7]

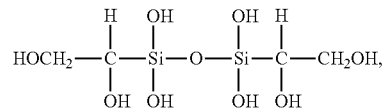

available from Shin-Etsu Chemical Co., Ltd.

(2) Preparation of Antifogging Coating Composition (Elongated Colloidal Silica, Spheroidal Colloidal Silica, and Silane Derivative Compound Mixture)

Antifogging coating compositions were prepared by mixing the following materials: acidic elongated colloidal silica (ST-OUP [solid content: 15%, aqueous dispersion], Nissan Chemical Industries, Ltd.), basic elongated colloidal silica (ST-UP [solid content: 20%, aqueous dispersion], Nissan Chemical Industries, Ltd.), basic spheroidal colloidal silica (ST-N [solid content: 20%, aqueous dispersion], Nissan Chemical Industries, Ltd.), basic spheroidal colloidal silica (ST-NXS [solid content: 15%, aqueous dispersion], Nissan Chemical Industries, Ltd.), a silane derivative compound having a polyethylene glycol chain in the molecule (Dynasylan 4148 [solid content: 100%], Evonik Japan Co., Ltd.), a silane derivative compound having a polyethylene glycol chain and an acyl group in the molecule (2-[acetoxy(polyethyleneoxy)propyl]triethoxysilane, [solid content: 100%], Gelest Inc.), a silane derivative compound having a polyethylene glycol chain and a urethane group in the molecule (urethane silane A, urethane silane B, urethane silane C, or urethane silane D, synthesized by the method to be described below), a silane derivative compound having an epoxy group in the molecule (KBM403 [solid content: 100%], Shin-Etsu Chemical Co., Ltd.), a surfactant (NEOCOL-YSK, [solid content 70%, propylene glycol-water mixed dispersion], DKS Co., Ltd.), a surfactant (KF640, Shin-Etsu Chemical Co., Ltd.), and as organic solvents, isopropanol (KANTO CHEMICAL CO., INC.), propylene glycol monomethyl ether (NIPPON NYUKAZAI CO., LTD.), and diacetone alcohol (Tokyo Chemical Industry Co., Ltd.). The constituent configuration of each antifogging coating composition is given in Table 3. In addition, X-12-1098 ([solid content: 30%, aqueous dispersion], Shin-Etsu Chemical Co., Ltd.), which is a silane derivative compound not corresponding to any of a silane derivative compound having a polyethylene glycol chain in the molecule and a silane derivative compound having an epoxy group in the molecule, was prepared as one of silane derivative compound, and used as the antifogging coating composition of comparative examples (Table 4).

The silane derivative compounds having a polyethylene glycol chain and a urethane group in the molecule (urethane silane A, urethane silane B, urethane silane C, and urethane silane D) used in examples were synthesized as follows:

(2-1) Synthesis of Urethane Silane A

Into a 50 mL eggplant-shaped flask, 6.6 parts by weight of 3-isocyanatopropyltrimethoxysilane (Tokyo Chemical Industry Co., Ltd., [solid content: 100%]) and 16.3 parts by weight of UNIOX M-400 (polyethylene glycol blocked with methyl group, NOF CORPORATION [solid content: 100%]) were supplied, and the resulting mixture was stirred at 75° C. for 10 hours. It was confirmed by $^1$H-NMR that a peak derived from an isocyanate group had disappeared, and the urethane silane A represented by the following formula was obtained:

[Chemical Formula 8]

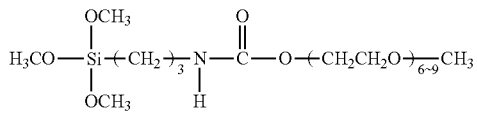

(2-2) Synthesis of Urethane Silane B

Into a 50 mL eggplant-shaped flask, 10.0 parts by weight of KBE-9007N (3-isocyanatepropyltriethoxysilane, Shin-Etsu Chemical Co., Ltd. [solid content: 100%]) and 16.2 parts by weight of polyethylene glycol 400 (FUJIFILM Wako Pure Chemical Corporation [solid content: 100%]) were supplied, and the mixture was stirred at 75° C. for 10 hours. It was confirmed by $^1$H-NMR that a peak derived from an isocyanate group had disappeared, and the urethane silane B represented by the following formula was obtained:

[Chemical Formula 9]

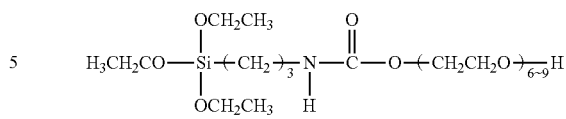

(2-3) Synthesis of Urethane Silane C

Into a 50 mL eggplant-shaped flask, 10.0 parts by weight of KBE-9007N (3-isocyanatepropyltriethoxysilane, Shin-Etsu Chemical Co., Ltd. [solid content: 100%]) and 8.1 parts by weight of polyethylene glycol 200 (FUJIFILM Wako Pure Chemical Corporation [solid content: 100%]) were supplied, and the mixture was stirred at 75° C. for 10 hours. It was confirmed by $^1$H-NMR that a peak derived from an isocyanate group had disappeared, and the urethane silane C represented by the following formula was obtained:

[Chemical Formula 10]

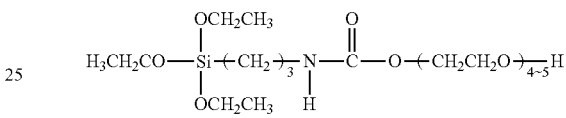

(2-4) Synthesis of Urethane Silane D

Into a 50 mL eggplant-shaped flask, 10.0 parts by weight of KBE-9007N (3-isocyanatepropyltriethoxysilane, Shin-Etsu Chemical Co., Ltd. [solid content: 100%]) and 24.3 parts by weight of polyethylene glycol 600 (FUJIFILM Wako Pure Chemical Corporation [solid content: 100%]) were supplied, and the mixture was stirred at 75° C. for 10 hours. It was confirmed by $^1$H-NMR that a peak derived from an isocyanate group had disappeared, and the urethane silane D represented by the following formula was obtained:

[Chemical Formula 11]

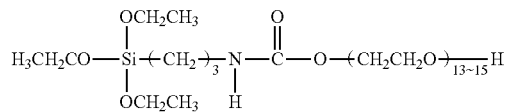

TABLE 3

Blending of antifogging coating composition and evaluation of antifogging coating film (Examples)

| | | | Examples | | | | | |
|---|---|---|---|---|---|---|---|---|
| | | | 3 | 4 | 5 | 6 | 7 | 8 |
| Antifogging coating composition (parts by weight) | Elongated colloidal silica | ST-OUP | 25.62 | 25.62 | 25.62 | 25.62 | 25.20 | 25.62 |
| | | ST-UP | 6.40 | 6.40 | 6.40 | 6.40 | 6.40 | 6.40 |
| | Spheroidal colloidal silica | ST-N | 5.49 | 5.49 | 5.49 | 5.49 | 5.49 | 5.49 |
| | | ST-NXS | 7.32 | 7.32 | 7.32 | 7.32 | 7.32 | 7.32 |
| | Silane derivative compound | Dynasylan 4148 | 0.19 | | | | | |
| | | KBM403 | 0.27 | 0.27 | 0.27 | 0.27 | 0.27 | 0.27 |
| | | Acetylsilane | | 0.19 | | | | |
| | | Urethane silane A | | | 0.21 | | | |
| | | Urethane silane B | | | | 0.23 | | |

TABLE 3-continued

Blending of antifogging coating composition and evaluation of antifogging coating film (Examples)

|  |  |  | Examples | | | | | |
|---|---|---|---|---|---|---|---|---|
|  |  |  | 3 | 4 | 5 | 6 | 7 | 8 |
|  |  | Urethane silane C |  |  |  |  | 0.16 |  |
|  |  | Urethane silane D |  |  |  |  |  | 0.29 |
|  |  | X-12-1098 |  |  |  | 1.28 |  |  |
|  | Surfactant | NC-YSK | 0.16 | 0.16 | 0.16 | 0.16 | 0.16 | 0.16 |
|  |  | KF640 | 0.08 | 0.08 | 0.08 | 0.08 | 0.08 | 0.08 |
|  | Solvent | IPA | 34.49 | 34.49 | 34.47 | 34.45 | 34.52 | 34.39 |
|  |  | PGM | 18.16 | 18.16 | 18.16 | 18.16 | 18.16 | 18.16 |
|  |  | DAA | 1.82 | 1.82 | 1.82 | 1.82 | 1.82 | 1.82 |
|  | Total |  | 100 | 100 | 100 | 100 | 100 | 100 |
| Evaluation | Initial coating film | Coatability | Good | Good | Good | Good | Good | Good |
|  |  | Antifogging properties | Not fogged | Not fogged | Not fogged | Not fogged | Not fogged | Not fogged |
|  |  | Adhesion | Good | Good | Good | Good | Good | Good |
|  | Coating film after water resistance test | Antifogging properties | Not fogged | Not fogged | Not fogged | Not fogged | Not fogged | Not fogged |
|  |  | Adhesion | Good | Good | Good | Good | Good | Good |
|  | Coating film after heat resistance test | Antifogging properties | Not fogged | Not fogged | Not fogged | Not fogged | Not fogged | Not fogged |
|  |  | Adhesion | Good | Good | Good | Good | Good | Good |

TABLE 4

Blending of antifogging coating composition and evaluation of antifogging coating film (Comparative Examples)

|  |  |  | Comparative Examples | | | | |
|---|---|---|---|---|---|---|---|
|  |  |  | 6 | 7 | 8 | 9 | 10 |
| Antifogging coating composition (parts by weight) | Elongated colloidal silica | ST-OUP | 25.62 | 25.62 | 25.62 | 25.20 | 25.62 |
|  |  | ST-UP | 6.40 | 6.40 | 6.40 | 6.30 | 6.40 |
|  | Spheroidal colloidal silica | ST-N | 5.49 | 5.49 | 5.49 | 5.40 | 5.49 |
|  |  | ST-NXS | 7.32 | 7.32 | 7.32 | 7.20 | 7.32 |
|  | Silane derivative compound | Dynasylan 4148 | 0.38 |  |  | 0.40 | 0.19 |
|  |  | KBM403 |  | 0.54 |  | 0.56 | 0.27 |
|  |  | Acetylsilane |  |  |  |  |  |
|  |  | Urethane silane A |  |  |  |  |  |
|  |  | Urethane silane B |  |  |  |  |  |
|  |  | Urethane silane C |  |  |  |  |  |
|  |  | Urethane silane D |  |  |  |  |  |
|  |  | X-12-1098 |  |  | 1.28 |  |  |
|  | Surfactant | NC-YSK | 0.16 | 0.16 | 0.16 | 0.16 | 0.16 |
|  |  | KF640 | 0.08 | 0.08 | 0.08 | 0.08 | 0.08 |
|  | Solvent | IPA | 34.57 | 34.41 | 33.67 | 34.72 | 36.31 |
|  |  | PGM | 18.16 | 18.16 | 18.16 | 18.16 | 18.16 |
|  |  | DAA | 1.82 | 1.82 | 1.82 | 1.82 | 1.82 |
|  | Total |  | 100 | 100 | 100 | 100 | 100 |
| Evaluation | Initial coating film | Coatability | Good | Good | Good | Good | Good |
|  |  | Antifogging properties | Not fogged | Not fogged | Not fogged | Not fogged | Not fogged |
|  |  | Adhesion | Good | Good | Good | Good | Good |
|  | Coating film after water resistance test | Antifogging properties | Not fogged | Fogged | Fogged | Fogged | Not fogged |
|  |  | Adhesion | Poor | Good | Poor | Good | Poor |
|  | Coating film after heat resistance test | Antifogging properties | Not fogged | Fogged | Fogged | Fogged | Not fogged |
|  |  | Adhesion | Good | Good | Good | Good | Good |

The meanings of the abbreviations in Tables 3 and 4 are as follows:

ST-OUP: Trade name of acidic elongated colloidal silica, available from Nissan Chemical Industries, Ltd.

ST-UP: Trade name of basic elongated colloidal silica, available from Nissan Chemical Industries, Ltd.

ST-N: Trade name of basic spheroidal colloidal silica having a particle diameter of 12 nm, available from Nissan Chemical Industries, Ltd.

ST-NXS: Trade name of basic spheroidal colloidal silica having a particle diameter of 5 nm, available from Nissan Chemical Industries, Ltd.

NC-YSK: NEOCOL-YSK, trade name of anionic surfactant, available from DKS Co., Ltd.
KF640: Trade name of nonionic surfactant, available from Shin-Etsu Chemical Co., Ltd.
IPA: Isopropanol
PGM: Propylene glycol monomethyl ether
DAA: Diacetone alcohol
Dynasylan 4148: Trade name of a silane derivative compound having a polyethylene glycol chain in the molecule and represented by the following formula:

[Chemical Formula 12]

$$CH_3O-\underset{\underset{OCH_3}{|}}{\overset{\overset{OCH_3}{|}}{Si}}-(CH_2)_{q}-(OCH_2CH_2)_{r}-O-CH_3$$

wherein q is a number corresponding to n in the above-described Formula 1-1, and r is a number corresponding to m in the above-described Formula 1-1, available from Evonik Japan Co., Ltd.

KBM403: Trade name of 3-glycidoxypropyltrimethoxysilane, which is a silane derivative compound having an epoxy group in the molecule and represented by the following formula:

[Chemical Formula 13]

$$CH_3O-\underset{\underset{OCH_3}{|}}{\overset{\overset{OCH_3}{|}}{Si}}-(CH_2)_{3}-OCH_2-CH-CH_2$$
(with epoxide ring on the terminal CH—CH$_2$—O)

available from Shin-Etsu Chemical Co., Ltd.

Acetylsilane: 2-[acetoxy(polyethyleneoxy)propyl]triethoxysilane, a silane derivative compound having a polyethylene glycol chain and an acyl group in the molecule, represented by the following formula:

[Chemical Formula 14]

$$H_3CH_2CO-\underset{\underset{OCH_2CH_3}{|}}{\overset{\overset{OCH_2CH_3}{|}}{Si}}-(CH_2)_{3}-O-(CH_2CH_2O)_{6\sim9}-\overset{\overset{O}{\|}}{C}-CH_3,$$

available from Gelest Inc.

Urethane silane A, urethane silane B, urethane silane C, and urethane silane D: Synthetic products as described above X-12-1098: Trade name of a silane derivative compound not corresponding to any of a silane derivative compound having a polyethylene glycol chain in the molecule and a silane derivative compound having an epoxy group in the molecule, which is represented by the following formula:

[Chemical Formula 15]

$$HOCH_2-\underset{\underset{OH}{|}}{\overset{\overset{H}{|}}{C}}-\underset{\underset{OH}{|}}{\overset{\overset{OH}{|}}{Si}}-O-\underset{\underset{OH}{|}}{\overset{\overset{OH}{|}}{Si}}-\underset{\underset{OH}{|}}{\overset{\overset{H}{|}}{C}}-CH_2OH,$$

available from Shin-Etsu Chemical Co., Ltd.

(3) Preparation of Antifogging Coating Film

Each antifogging coating composition was applied onto a polycarbonate resin plate substrate. Application was performed by using an air spray method, and the thickness of the antifogging coating film after formation of the antifogging coating composition was adjusted to 1 µm. The substrate coated with the antifogging coating composition was placed in an oven at 110° C. and heated for 15 minutes to evaporate water and the organic solvent, thereby forming an antifogging coating film. In this way, each antifogging coating film test piece was obtained.

(4) Evaluation of Coatability of Antifogging Coating Film

The surfaces of the antifogging coating film test pieces were visually observed. A case where a homogeneous antifogging coating film was obtained is described as "good", and a case where cracking, cis sing or the like was observed on the surface of the antifogging coating film is described as "poor".

(5) Evaluation of Antifogging Properties of Antifogging Coating Film

Antifogging coating film test pieces were each disposed at a position 1 cm above the water surface of a hot water bath at 60° C. such that the coating film faced downward, and steam from the hot water bath was applied to the coating film. After a lapse of one minute, whether or not fog was formed on the coating film was visually observed. A coating film having no fog on its surface is described as "not fogged", and a coating film having fog on its surface is described as "fogged".

(6) Evaluation of Adhesion of Antifogging Coating Film

The presence or absence of peeling of the antifogging coating film on each antifogging coating film test piece was visually observed by a method in accordance with JIS K 5600-5-6 (Testing methods for paints, Mechanical property of film, Adhesion test [Cross-cut test]). A case where peeling of the coating film was not observed is described as "good", and the case where peeling of the coating film was observed is described as "poor".

(7) Wet Heat Resistance Test of Antifogging Coating Film

Each antifogging coating film test piece was placed in an environment of a temperature of 50° C. and a humidity of 95% and left to stand for 24 hours. The antifogging coating film test piece was taken out from the environment and left to stand at room temperature for 12 hours.

(8) Evaluation of Antifogging Properties of Antifogging Coating Film after Wet Heat Resistance Test After the wet heat resistance test described above, antifogging coating film test pieces were each disposed at a position 1 cm above the water surface of a hot water bath at 40° C. such that the coating film faced downward, and steam from the hot water bath was applied to the coating film. After a lapse of ten seconds, whether or not fog was formed on the coating film was visually observed. A coating film having no fog on its surface is described as "not fogged", and a coating film having fog on its surface is described as "fogged".

(9) Evaluation of Adhesion of Antifogging Coating Film after Wet Heat Resistance Test After the wet heat resistance test described above, the presence or absence of peeling of the antifogging coating film on each antifogging coating film test piece was visually observed by a method in accordance with JIS K 5600-5-6 (Testing methods for paints, Mechanical property of film, Adhesion test [Cross-cut test]). A case where peeling of the coating film was not observed (including a case where the adhesive component of the transparent pressure-sensitive adhesive tape used in the test remains on the antifogging coating film test piece) is described as "good", and a case where peeling of the coating film was observed is described as "poor".

(10) Heat Resistance Test of Antifogging Coating Film

Each antifogging coating film test piece was placed in a dried oven at 130° C. and left to stand for 72 hours, and then further left to stand at room temperature for 12 hours.

(11) Evaluation of Antifogging Properties of Antifogging Coating Film after Heat Resistance Test After the heat resistance test described above, antifogging coating film test pieces were each disposed at a position 1 cm above the water surface of a hot water bath at 40° C. such that the coating film faced downward, and steam from the hot water bath was applied to the coating film. After a lapse of ten seconds, whether or not fog was formed on the coating film was visually observed. A coating film having no fog on its surface is described as "not fogged", and a coating film having fog on its surface is described as "fogged".

(12) Evaluation of Adhesion of Antifogging Coating Film after Heat Resistance Test After the heat resistance test described above, the presence or absence of peeling of the antifogging coating film on each antifogging coating film test piece was visually observed by a method in accordance with JIS K 5600-5-6 (Testing methods for paints, Mechanical property of film, Adhesion test [Cross-cut test]). A case where peeling of the coating film was not observed (including a case where the adhesive component of the transparent pressure-sensitive adhesive tape used in the test remains on the antifogging coating film test piece) is described as "good", and a case where peeling of the coating film was observed is described as "poor".

(13) Water Resistance Test of Antifogging Coating Film

Each antifogging coating film test piece was immersed in water at 60° C. and left for 240 hours. The antifogging coating film test piece was taken out from water and left to stand at room temperature for 12 hours.

(14) Evaluation of Antifogging Properties of Antifogging Coating Film after Water Resistance Test After the water resistance test described above, antifogging coating film test pieces were each disposed at a position 1 cm above the water surface of a hot water bath at 40° C. such that the coating film faced downward, and steam from the hot water bath was applied to the coating film. After a lapse of ten seconds, whether or not fog was formed on the coating film was visually observed. A coating film having no fog on its surface is described as "not fogged", and a coating film having fog on its surface is described as "fogged".

(15) Evaluation of Adhesion of Antifogging Coating Film after Water Resistance Test After the water resistance test described above, the presence or absence of peeling of the antifogging coating film on each antifogging coating film test piece was visually observed by a method in accordance with JIS K 5600-5-6 (Testing methods for paints, Mechanical property of film, Adhesion test [Cross-cut test]). A case where peeling of the coating film was not observed (including a case where the adhesive component of the transparent pressure-sensitive adhesive tape used in the test remains on the antifogging coating film test piece) is described as "good", and a case where peeling of the coating film was observed is described as "poor".

Examples 1 and 2 and Comparative Examples 1 and 2

Examples 1 and 2 and Comparative Examples 1 and 2 are experimental examples in which the type and blending amount of the silane derivative compound were changed. The antifogging coating films of Examples 1 and 2 in which a silane derivative compound having a polyethylene glycol chain in the molecule and a silane derivative compound having an epoxy group in the molecule were used in combination exhibited good results in all of coatability, antifogging properties, and adhesion. Even after the wet heat resistance test and the heat resistance test, the antifogging coating films of Examples 1 and 2 also exhibited good results in antifogging properties and adhesion. In Comparative Example 1, a silane derivative compound having an epoxy group in the molecule was not blended. The antifogging coating film of Comparative Example 1 had a decrease in adhesion after the wet heat resistance test. In Comparative Example 2, a silane derivative compound not corresponding to any of a silane derivative compound having a polyethylene glycol chain in the molecule and a silane derivative compound having an epoxy group in the molecule was blended. The antifogging coating film of Comparative Example 2 had decreases in adhesion and antifogging properties after the wet heat resistance test, and had a decrease in antifogging properties after the heat resistance test.

Examples 1 and 2 and Comparative Examples 3 to 5

Examples 1 and 2 and Comparative Examples 3 to 5 are experimental examples in which the amount of diacetone alcohol as an organic solvent was changed. The antifogging coating film formed from the antifogging coating composition of Comparative Example 3 in which no diacetone alcohol is blended had a decrease in adhesion after the wet heat resistance test. The antifogging coating film of Comparative Example 4 in which 0.86 wt % of diacetone alcohol is blended in the antifogging coating composition had a decrease in adhesion after the wet heat resistance test, and the antifogging coating film of Comparative Example 5 in which 8.75 wt % of diacetone alcohol is blended in the antifogging coating composition had difficulty in coatability.

Examples 3 to 8

Examples 3 to 8 are experimental examples in which the type and blending amount of the silane derivative compound were changed. In all Examples 3 to 8, a silane derivative compound having a polyethylene glycol chain in the molecule and a silane derivative compound having an epoxy group in the molecule were used in combination. The antifogging coating film of Examples 3 to 8 exhibited good results in all of coatability, antifogging properties, and adhesion, exhibited good results in antifogging properties and adhesion after the water resistance test, and also exhibited good results in antifogging properties and adhesion after the heat resistance test. Coatability, antifogging properties, and adhesion of the antifogging coating film were good, and the antifogging properties and the adhesion after the water resistance test were not deteriorated, even when a silane derivative compound having a polyethylene glycol chain and an acyl group in the molecule (acetylsilane) was used (Example 4), or a silane derivative compound having a polyethylene glycol chain and a urethane group in the molecule (urethane silanes A to D) was used (Examples 5 to 8), as a silane derivative compound having a polyethylene glycol chain in the molecule. It can be seen from the results of Examples 4 and 6 that the terminal of the silane derivative compound having a polyethylene glycol chain in the molecule has no significant influence on the performance of the antifogging coating film, whether the terminal is an ester bond (Example 4) or a hydroxy group (Example 6). Further, it can be seen from the results of Examples 6 to 8 that when the length of the repeating unit of a polyethylene glycol chain existing in the silane derivative compound having a polyethylene glycol chain in the molecule (number of m, $m_1$, $m_2$) is in the range of at least 4 to 15, the performance of the antifogging coating film is not adversely affected.

Example 3 and Comparative Examples 6 to 8

Example 3 and Comparative Examples 6 to 8 are experimental examples in which the type and blending amount of the silane derivative compound were changed. The antifogging coating films of Example 3 in which a silane derivative compound having a polyethylene glycol chain in the molecule and a silane derivative compound having an epoxy group in the molecule were used in combination exhibited good results in all of coatability, antifogging properties, and adhesion. The antifogging coating film of Example 3 also exhibited good results in antifogging properties and adhesion after the water resistance test and the heat resistance test. In Comparative Example 6, only a silane derivative compound having a polyethylene glycol chain in the molecule was blended. The antifogging coating film of Comparative Example 6 had a decrease in adhesion after the water resistance test. In Comparative Example 7, only a silane derivative compound having an epoxy group in the molecule was blended. The antifogging coating film of Comparative Example 7 had a decrease in antifogging properties after the water resistance test and the heat resistance test. In Comparative Example 8, a silane derivative compound not corresponding to any of a silane derivative compound having a polyethylene glycol chain in the molecule and a silane derivative compound having an epoxy group in the molecule was blended. The antifogging coating film of Comparative Example 8 had decreases in antifogging properties and adhesion after the water resistance test, and in antifogging properties after the heat resistance test.

Example 3 and Comparative Examples 9 and 10

Comparative Example 9 is an experimental example in which the components identical to those in Example 3 were blended but the blending amount of the silane derivative compound was increased. The antifogging coating film of Comparative Example 9 had a decrease in antifogging properties after the water resistance test and the heat resistance test. Comparative Example 10 is an experimental example made to be identical to Example 3 except that diacetone alcohol was not blended. The antifogging coating film of Comparative Example 10 had a decrease in adhesion after the water resistance test.

REFERENCE SIGNS LIST

1 Substrate
2 Elongated silica
3 Group derived from silane derivative compound having polyethylene glycol chain in molecule
4 Group derived from silane derivative compound having epoxy group in molecule
5 Spheroidal silica
6 Antifogging coating film

The invention claimed is:

1. An antifogging coating composition comprising:
    elongated colloidal silica which is a mixture of acidic elongated colloidal silica and basic elongated colloidal silica;
    a silane derivative compound mixture comprising at least a silane derivative compound having a polyethylene glycol chain in a molecule and a silane derivative compound having an epoxy group in a molecule; and
    an organic solvent comprising diacetone alcohol;
    wherein the silane derivative compound mixture is comprised of 0.1 parts by weight or more and 10.0 parts by weight or less in terms of solid content per 100 parts by weight of the elongated colloidal silica in terms of solid content, and
    wherein diacetone alcohol comprises 1-7% by weight of the antifogging coating composition.

2. The antifogging coating composition according to claim 1, wherein the silane derivative compound having a polyethylene glycol chain in a molecule further has an acyl group or a urethane group in a molecule.

3. The antifogging coating composition according to claim 1,
    wherein the silane derivative compound mixture is a mixture comprising at least one silane derivative compound selected from the following General Formula (1-2) or (1-3) as the silane derivative compound having a polyethylene glycol chain in a molecule, and the silane derivative compound of the following General formula (2) as the silane derivative compound having an epoxy group in a molecule:

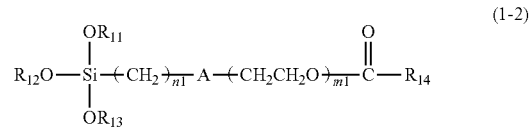

(wherein R11, R12, R13, and R14 are each an alkyl group having 1 to 3 carbon atoms, which are identical to or different from one another, A is selected from the group consisting of —O—, —NHCOO—, —OCO—, —COO—, —OCH2CH(OH) CH2O—, —OCH2CH2CH(OH)O—, —S—, —SCO—, and —COS—, n1 is an integer of 1 to 5, and m1 is an integer of 1 to 20)

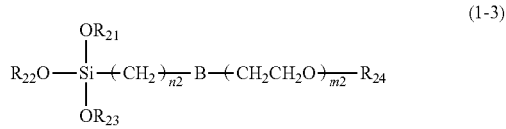

(wherein R21, R22, and R23 are each an alkyl group having 1 to 3 carbon atoms, which are identical to or different from one another, R24 is a hydrogen atom or an alkyl group having 1 to 3 carbon atoms, B is selected from the group consisting of —NHCOO—, —OCO—, —COO—, —OCH2CH(OH)CH2O—, —OCH2CH2CH(OH)O—, —S—, —SCO—, and —COS—, n2 is an integer of 1 to 5, and m2 is an integer of 1 to 20)

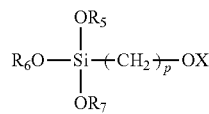

(2)

(wherein R5, R6, and R7 are each an alkyl group having 1 to 3 carbon atoms, which are identical to or different from one another, p is an integer of 1 to 5, and X is an epoxy group or a glycidyl group).

4. The antifogging coating composition according to claim 1, further comprising spheroidal colloidal silica.

5. The antifogging coating composition according to claim 4,
wherein a solid content weight ratio between the elongated colloidal silica and the spheroidal colloidal silica is 12:10 to 35:10.

6. The antifogging coating composition according to claim 4,
wherein
the spheroidal colloidal silica is basic spheroidal colloidal silica.

7. The antifogging coating composition according to claim 6, further comprising a surfactant.

8. The antifogging coating composition according to claim 2, further comprising spheroidal colloidal silica.

9. The antifogging coating composition according to claim 8, wherein a solid content weight ratio between the elongated colloidal silica and the spheroidal colloidal silica is 12:10 to 35:10.

10. The antifogging coating composition according to claim 9, wherein the spheroidal colloidal silica is basic spheroidal colloidal silica.

11. The antifogging coating composition according to claim 10, further comprising a surfactant.

* * * * *